Oct. 16, 1956  J. RIGO  2,766,681
PORTABLE BROILER
Filed Jan. 16, 1956  2 Sheets-Sheet 1
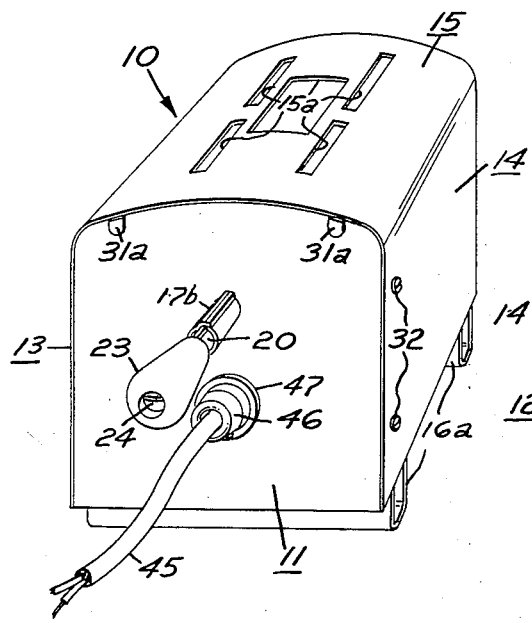
FIG. 1
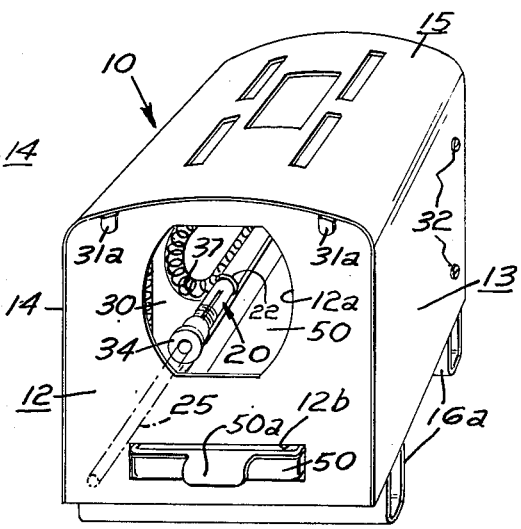
FIG. 2
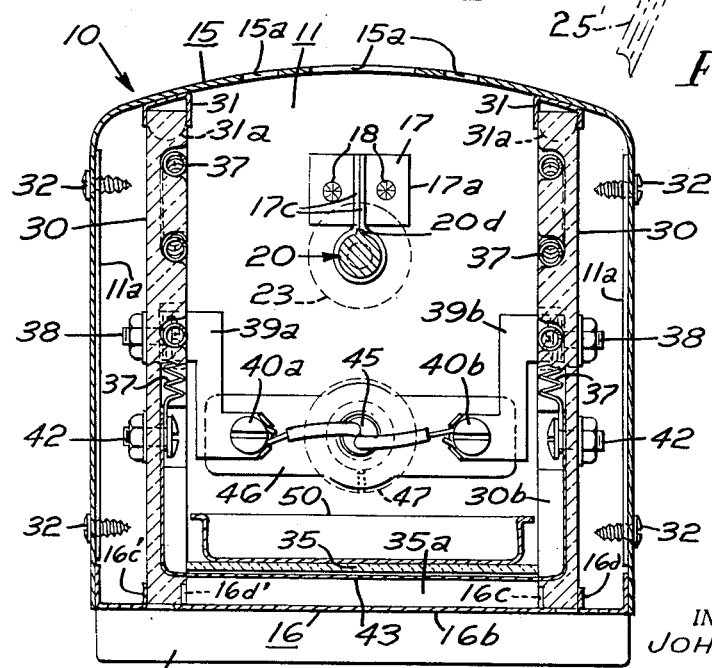
FIG. 4
FIG. 1A
INVENTOR:
JOHN RIGO
BY
Green, McCallister & Miller
HIS ATTORNEYS.

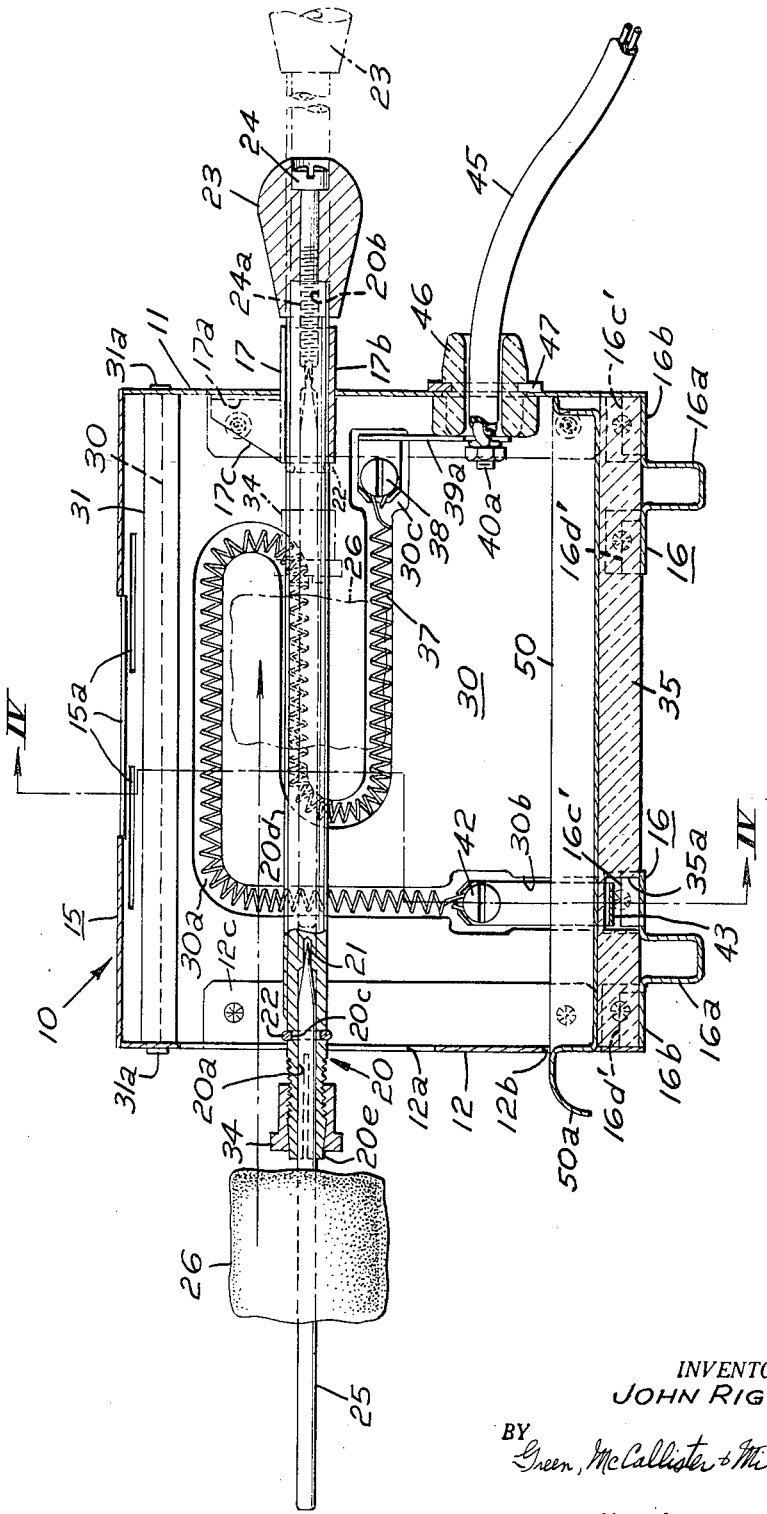

United States Patent Office 2,766,681
Patented Oct. 16, 1956

2,766,681

PORTABLE BROILER

John Rigo, Munhall, Pa.

Application January 16, 1956, Serial No. 559,193

8 Claims. (Cl. 99—419)

This invention relates to a portable broiler or grill and particularly, to an electric unit that will facilitate the cooking and handling of items involved.

I have found that there is a need for a relatively simple, compact and practical form of small heating broiler which may be employed indoors or outdoors for cooking items such as hot dogs, small steaks, bacon, etc., and for toasting marshmallows. I have found that an important consideration or factor in providing a practical device arises in connection with the handling of the item to be cooked.

It has thus been an object of my invention to provide a new and improved portable cooking or broiler device;

Another object has been to devise a practical form of cooking device which may be used safely by children, as well as grown-ups, and which will facilitate the handling of the items to be cooked before and after they have been cooked;

A further object of my invention has been to devise a portable cooking device having a removable spit portion or part which can be employed to support the item being cooked during the cooking operation and then later employed to support the item while it is being handled and eaten;

These and other objects of my invention will appear to those skilled in the art from the illustrated embodiment shown in the drawings and described hereinafter.

In the drawings, Figure 1 is a perspective view in elevation of one end of a device constructed in accordance with my invention;

Figure 1A is slightly enlarged fragmental view showing a modified spit construction;

Figure 2 is a perspective view of an opposite end of the device of and on the same scale as Figure 1;

Figure 3 is an enlarged side or longitudinal section in elevation through the device of Figures 1 and 2 and somewhat diagrammatically showing the use of its spit end portion or part in carrying an item to be cooked or broiled; the full lines show the item in an outer or delivery position and the dot and dash lines show it in an inner or cooking position;

And Figure 4 is an end section in elevation on the scale of and taken along the line IV—IV of Figure 3.

In the perspective views of Figures 1 and 2, I have shown a portable broiler, grill or cooking device 10 made up of sheet-like metal members into a unitary, somewhat rectangular, wall construction. The walls of the device 10 comprise an operating end wall portion 11, an opposite end wall portion 12, opposed-longitudinally-extending side wall portions 13 and 14, a convexly-rounded or gable-shaped roof or top portion 15, and a bottom portion made up of two similar pieces 16. Each piece 16 extends transversely in a side-by-side relation with the other and is suitably secured in position to bottom edges of the side portions 13 and 14, as by welding or brazing.

Centrally-positioned, downwardly-projecting ribs or channel portions 16a of the pieces 16 provide front and back legs for the oven. Side portions 16b have pairs of cut-out and upwardly-bent guide tabs 16c—16d and 16c'—16d' (see Figures 3 and 4). As shown, the tabs of each pair are staggered with respect to each other and, as shown in Figure 4, provide bottom side-guides for wall plate members 30. As shown in Figures 1 to 4, slide-guide channels 31 are secured by their end tabs 31a along opposite side portions of the roof 15 to provide top guides for the side plate members 30.

I prefer to coat or paint the outer surfaces of the walls with a suitable weather-resistant and preferably, an insulating type of coating, such as of a flock or crackle type, although, if desired, the outer surfaces may be polished.

The end wall 11 has side-lap portions 11a, in order that self-locking metal screws 32 may secure it to the side wall portions 13 and 14. If desired, the portions 12, 13, 14 and 15 may be formed from one sheet of metal that is patterned, slit and bent to the shape shown. The top edge of the end wall 12 may be slit with respect to the top wall 15 and bent from the side wall 13 along one of its vertical edges; its other vertical edge has an edge tab 12c (see Figure 3) that is shown secured by spot welding (see Figure 3) to the side wall portion 14. The side wall portion 13, the roof wall 15, and the side wall portion 14 may be connected as a single piece.

The walls of the device 10 which comprise an enclosing housing body, define an inner, lengthwise-extending cooking or broiling chamber within which an item, such as 26 (see Figure 3), is to be cooked or broiled. Viewing-access as well as ventilation of the cooking chamber is attained in a simple manner by the use of window slits or open portions 15a in the roof or top wall 15. An item to be cooked (see 26 of Figure 3) is carried by a longitudinally-extending rod or sleeve-like element, part or split device 20. In its extended position of the full lines of Figures 1 and 3, the device 20 is adapted to, at its forward or extending end, project out of the chamber at the opposite end wall 12 of the housing body. An open end portion or doorway 12a through the opposite end wall 12 is of sufficient size, as shown particularly in Figures 2 and 3, to freely permit the food item to be moved within the cooking chamber and, after it has been cooked, to be removed therefrom.

The split device 20 is of a heat-resistant material, such as metal, and is slidably-operatively carried by a hanger sleeve means or part 17, see particularly Figures 1, 3 and 4. The sleeve means or part 17 is of split construction, having a pair of wing portions 17a and a rod-mounting, slide-sleeve portion 17b, see particularly Figure 4. The wing portions 17a are reinforced at their adjacent inner edges by perpendicularly or backwardly-projecting, reinforcing tab portions 17c, and are secured to the inside of the end wall 11 by suitable means, such as spot welds 18 of Figure 4. It will be noted that the sleeve portion 17b surrounds the back end portion of the rod-like device 20 and is of sufficient extent to substantially support it against pivotal action, although as shown in Figure 3, this is the only point of support for the device 20. A longitudinal spine portion 20d slidably fits within a cooperating groove of the sleeve 17 (see Figure 4) to prevent relative rotation.

As shown, one end of the device 20 projects outwardly through the working end wall 11, in a slidably-mounted relationship within the sleeve portion 17b and is provided with an outer handle 23 of suitable heat-resistant insulative material, such as wood, plastic, glass, etc. The handle 23 is secured on this end by a screw-headed set screw or bolt 24. It will be noted (see Figure 3) that the bolt 24 is threaded at 24a to engage within a threaded bore portion 20b of the part or device 20. Since the bolt 24 extends through the handle 23, it securely mounts the handle on the device 20.

At least at its extending or forward end portion, the part or device 20 is of hollow or sleeve-like construction and has an open-end bore 20a to receive a spit element, part or portion 25. The part 25 will preferably be of a heat-resistant and relatively non-conducting type of material, such as hard wood, and its end may be pointed to facilitate its insertion into an item of food 26. As shown particularly in Figure 3, one end portion of the spit 25 (after the item 26 has been positioned thereon) may be slid into the hollow bore portion 20a and into abutment with an annular, inner, limit stop or bore portion 21.

As shown in Figure 3, end portion 20e may be a chuck that is slit and threaded to receive a tightening-down threaded collar or nut 34. The collar 34 may be used when the item 26 is off-balanced on the spit 25 and it is desirable to prevent the latter from turning. It will be noted that the taper of the nut 34 squeezes the ends of 20e when the nut is turned to clamp the part 25 in position.

As shown by the dot and dash lines of Figure 3, the device or part 20 is then withdrawn backwardly within the chamber, so that the item 26 is in substantial alignment with heating elements 37 to accomplish the cooking operation. After the item 20 has been broiled or browned, the device 20 is then moved forwardly to its initial starting or preliminary position of the full lines of Figure 3. The spit part 25 may then be withdrawn with the item of food 26 thereon, using the spit part as a handle for the food item.

The handle 23 has an inner abutment end which, as shown in Figure 3, abuts the outer end of the sleeve portion 17b to limit the maximum forward slide movement or extension of the device 20. A groove 20c in a forward end portion of the device 20 carries a stop ring 22 to abut the sleeve portion 17b and limit the maximum forward extension or slide movement of the device 20.

As shown particularly in Figures 3 and 4, I have provided at least a pair of inner, auxiliary side or wall plate insulator members or portions 30 to mount a pair of suitable electrical heating elements 37. The plate or wall portions 30 will be of a suitable heat-resistant, non-conducting material such as porcelain, pressed asbestos or a suitable heat-resistant plastic, and are carried in a spaced relationship with the side walls 13 and 14 by upper guide channels 31 and lower slide-guide tab pairs 16c—16d and 16c'—16d'. It is thus apparent that the heating element assemblies may be easily replaced or repaired by removing the screws 32, the end wall portion 11, and sliding the members 30 and 35 outwardly of the device.

Suitable radiant type heating elements, such as electric resistance wire units 37, are positioned to lie along and within a slotted portion 30a of each wall plate member 30. One end of each element 37 is connected through a set screw 38 terminal and electric bus members 39a and 39b (see Figure 4) to opposite binding posts or terminals 40a and 40b of a suitable source of electrical energy 45. It will be noted that the ends of the bus bars 39a and 39b are positioned within enlarged slots 30c in the side plate insulator members 30.

By way of illustration, a one-piece porcelain inlet plug and anchorage assembly 46 is provided and which has the binding posts 40a and 40b. The part 46 is mounted from the inside of the housing body and is secured in position by a split snap ring 47, see Figure 3.

The opposite ends of the heating elements 37 are connected through screw assemblies or terminals 42 to a common cross bus bar 43. It will be noted that the bus bar 43 extends along a slightly enlarged slot or groove 30b (see Figure 3) in the members 30 and through a downwardly-open groove 35a in a floor insulator member or plate 35 which may also be of porcelain, pressed asbestos, mica, etc.

To collect food juices and also to facilitate a cleaning-out of the cooking or heating chamber of the unit, I have provided a slide shelf or tray 50 having up-turned side portions and a handle tab portion 50a. As shown particularly in Figures 2 and 3, the shelf 50 is adapted to be slid in and out of an opening 12b in the delivery end portion 12 of the unit above and on the insulator plate member 35.

It will appear that the heating elements can be controlled by an electric switch mounted in the source line 45 to quickly heat up the oven or broiler and maintain a cooking heat as long as desired. The heating elements 37 on both sides of the device are the same and are located in a heating plane or area that is localized above the spit device 20 and in an effectively spaced relationship above the bottom of the oven.

An important feature of the invention is the fact that an item of food such as 26 may be introduced into and removed from the oven without danger or burning the hands or doing damage to the heating elements. The item may be then immediately eaten without re-forking or re-picking it up by directly using the spit portion or part 25 as the handle or carrier. This with the loading and unloading the broiler from the far end thereof employing a spit device such as 20 are believed to be of considerable importance in the novel and improved results of the invention.

The type of operative positioning of the device 20 and limiting its position extremes assure that the item is held in the most efficient location for broiling or toasting. It is then withdrawn from the chamber for cooling and removal at an end of the device that is away from the operator, so that there is at any time a minimum risk or hazard of burns, electric shock, etc.

In Figure 1A, modified spit device 20' is of rectangular shape or at least has a rectangular bore 20'f. The latter slidably and non-turnably receives and positions spit element 25' which is of a complementary rectangular shape.

What I claim is:

1. In a portable broiler having an enclosing housing body defining a broiling chamber therein and provided with open portions for ventilation and inspection, heating means within and along the housing body, a heat-resistant spit device of rod-like construction, said device extending through an end wall of the housing body into and along the chamber, a handle carried on one end portion of said device and located outside the housing body; means slidably supporting said device from the end portion on which said handle is carried to, in a delivery position, project out of the chamber at an opposite end wall of said housing body and to, in a broiling position, project within the chamber; the opposite end wall of the housing body having an open portion therethrough of sufficient extent to bypass a food item into and out of the chamber, and a spit end portion carried by said device to support a food item within the chamber while it is being broiled and to deliver the broiled item adjacent the opposite end wall of the housing body.

2. A portable broiler as defined in claim 1 wherein, said slidable support means cooperates with said handle to limit the maximum outward slidable extension of said device with respect to the opposite end wall, and said support means is secured to the housing body adjacent the first above-mentioned end wall.

3. A portable broiler as defined in claim 1 wherein, said slidable support means is mounted on the first above-mentioned end wall and has a sleeve portion that extends along and slidably supports said device, and means cooperates with said slidable support means and said device to limit a maximum withdrawal of said device within the chamber and away from the opposite end wall.

4. A portable broiler as defined in claim 1 wherein said device has a rod-like element provided with an open-end bore at its extending end portion to removably position said spit portion therein to project outwardly therefrom.

5. A portable broiler as defined in claim 4 wherein said element has a stop portion within its bore limiting the maximum inward positioning of said spit portion therein, so that said spit portion can be inserted and removed from said bore with a food item thereon and adjacent said open end portion.

6. A portable broiler as defined in claim 4 wherein said device has means for limiting a maximum slidable extension of said rod-like element with respect to the chamber to a close adjacency of said handle with the first-mentioned end wall and the maximum withdrawal of said element to a position within the chamber wherein its extending end portion is in substantial alignment with said heating means.

7. A portable broiler as defined in claim 1 wherein said spit device and said slidable support means have co-operating slide portions to guide said spit device in a non-turning relationship while effecting slidable movement of said spit device with respect to the housing body.

8. In a portable broiler having an enclosing housing body defining a broiling chamber therein having side, end and bottom walls and an outwardly-convex roof wall defining a substantially rectangular-shaped housing body, a pair of insulating wall plate members along opposite inner sides of said housing body and mounted in an inwardly spaced-apart relationship thereon, electrical heating elements operatively carried by said insulating members in an opposed heating relationship with respect to each other and along the broiling chamber, open portions in said roof wall for ventilation and inspection of the broiling chamber, a source of electrical energy mounted on one end wall in an insulated relationship therewith, electrical bus bars connecting said source within the chamber to forward end portions of said electrical heating elements, a common bus bar connecting rear end portions of said heating elements together along the floor wall, insulating means positioned along the floor wall on the inside of the housing body to carry said common bus bar therein, a tray slidably mounted along said bottom insulating member for movement into and out of the chamber, a rod-like spit device of greater length than the housing body between its front and back end walls, a handle on one end portion of said spit device, a mounting sleeve part secured on the one end wall and defining a slidable support sleeve for said device to carry it in a longitudinally-extending relationship with respect to the chamber with its handle on the outside of such end wall, said device having a hollow-extending end portion positioned within the chamber, means cooperating with said device and with said mounting sleeve part to limit operative sliding movement of said device between an extended delivery position in which its extending end portion projects out of the chamber through and beyond the other end wall and a withdrawn position within which said end portion is in substantial alignment with said heating elements within the chamber, the other end wall having an open portion therethrough of sufficient extent to by-pass a food item carried by said device, a heat-resistant insulating spit element to reecive a food item to be broiled and to carry the item while it is being eaten, and said spit element being slidably positioned at one end within the hollow-extending end portion of said device while said device is withdrawn into the chamber, the food item is being broiled within the chamber, and said device is moved out of the other end portion to deliver the item.

No references cited.